Nov. 25, 1930.  C. A. PERSONS  1,782,973
BALL BEARING PEDAL FOR BICYCLES, ETC
Filed Feb. 1, 1929

Charles A. Persons, Inventor

Attorney

Patented Nov. 25, 1930

1,782,973

UNITED STATES PATENT OFFICE

CHARLES A. PERSONS, OF WORCESTER, MASSACHUSETTS, ASSIGNOR TO PERSONS-MAJESTIC MANUFACTURING COMPANY, OF WORCESTER, MASSACHUSETTS, A CORPORATION OF MASSACHUSETTS

BALL-BEARING PEDAL FOR BICYCLES, ETC.

Application filed February 1, 1929. Serial No. 336,700.

The present invention relates to a ball-bearing pedal of improved construction, which possesses marked advantages in manufacture and assembly, as well as requiring fewer parts than devices of the same character now in ordinary use.

Typical of many such devices is the construction of the ball-bearing pedal shown and described in my previous Patent No. 1,425,215, dated August 8, 1922, which requires an adjusting cone for the outer of the two rows of antifriction balls. Such a cone, constituting part of the race for the outer row of balls, must be very carefully and accurately made; moreover, the pedal spindle must be turned down and threaded to receive said cone, and additionally, said threaded end must be slotted to receive the tongue of a washer which usually is interposed between said cone and a lock nut on the outer end of the spindle.

It has been proposed heretofore, for example in the patent to Batcheller, No. 1,508,438, September 16, 1924, to eliminate this expensive and troublesome adjustment cone construction of ball bearing pedals. In all such proposals however, other difficulties of manufacture and assembly have arisen, such as the necessity for reducing the spindle diameter at its outer end to form a ball bearing raceway, in consequence of which the outer ball bearing must be of smaller diameter and with a lesser number of balls than the inner bearing.

Figure 1:
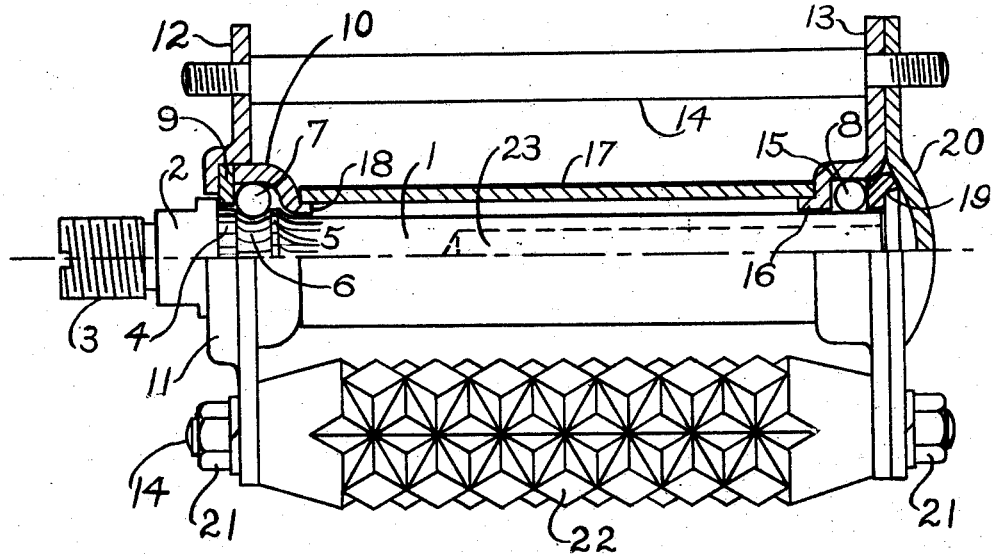
Figure 2:
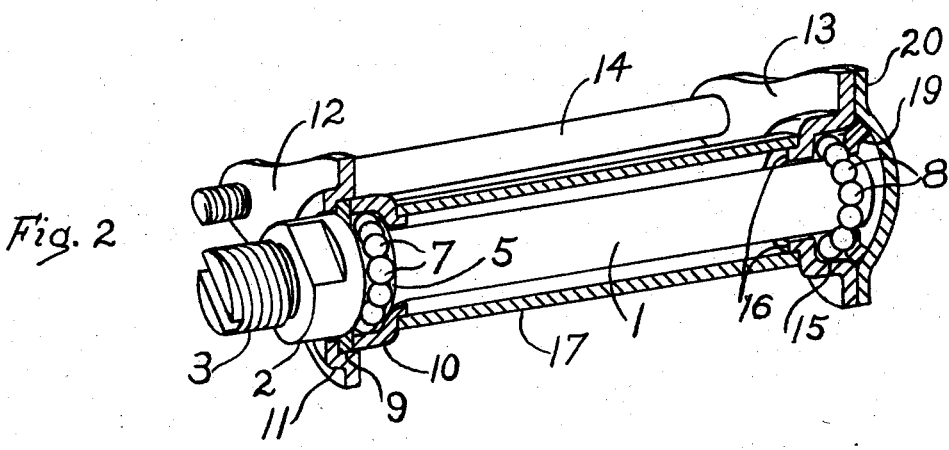

According to the present invention the disadvantages of both of the above described types of ball bearing pedals are eliminated, and their respective advantages retained, in a construction which utilizes fewer parts, of simpler and stronger design, and which can be assembled in a shorter time, in the entire absence of any need for adjustment. Other and further objects and advantages of the invention will appear from the following detailed description thereof, in connection with which reference is to be had to the accompanying drawings, wherein Fig. 1 is a plan view, partly in section, of a ball bearing pedal assembly embodying my invention, and Fig. 2 is an isometric view, partly in section, of the principal elements of the assembly, the section being taken in a plane at right angles to the section of Fig. 1.

Like reference characters refer to like parts in the different figures.

Referring to said drawings, the pedal spindle 1 provides at its inner end the usual head 2, from which projects a threaded stud 3 adapted to be screwed into the crank arm, not shown. Adjacent the head 2, the spindle 1 is formed with spaced integral collars 4 and 5, as best shown in Fig. 1, and between these collars, the spindle presents an annular concave surface 6 forming the inner raceway for a series of bearing balls 7, 7. The curvature of raceway 6 is preferably on a slightly larger radius than the ball radius, in consequence of which each ball 7 has a point contact with the bottom of said raceway; said bottom, or portion of least diameter, corresponds substantially in diameter to the uniform diameter of spindle 1 for the balance of said spindle's length beyond the collar 5, in consequence of which it will be seen that the balls 8, 8 of the other or outer bearing, which as hereinafter described make contact directly with the spindle 1 at its other end, can be of the same number and size as the inner balls 7, 7.

A hardened steel washer 9 encircles the collar 4 and seats against the head 2; this washer serves as an abutment for an annular cup-like member 10, whose inner surface, spaced from the groove or raceway 6, constitutes the outer raceway for the series of balls 7, 7. Within this cup-like member 10, each ball 7 makes point contact, and consequently, a two-point bearing is secured on each ball of this inner bearing, as distinguished from the usual three or four-point bearings that involve in the production of much more friction. In the event of any end thrust, the same is taken by the hardened steel washer 9, which, as shown in the drawings, is received, along with the inner end of the member 10 in an annular recess 11 of the usual cross plate 12, the latter encircling the spindle head 2 and being held in spaced relation to the corresponding cross plate 13 at the other end of the spindle, by the bolts 14, 14, as hereinafter described.

Said cross plate 13 at the other end of the spindle 1, like the outer cross plate shown in my previous Patent No. 1,425,215 aforesaid, itself provides the ball cup for the outer bearing as shown at 15, and in addition, an annular collar or flange 16 encircling the spindle 1, and whereon is received a spacing tube 17 that encircles, at its other end, a similar flange or collar 18 of the cup-like member 10. The balls 8, 8 of the outer bearing, preferably of the same number and size as the balls 7, 7 of the inner bearing, are inserted between the spindle 1 and the inner wall of the cup portion 15 of cross plate 13, as best shown in Fig. 1. Said balls 8, 8 are retained in this space by a washer 19, encircling the spindle 1, and held against outward displacement by its contact with the inner face of a dust cap 20, the latter being held against the cross plate 13 by the nuts 21, 21 of the spacing bolts 14, 14, which, as usual, carry the pedal treads 22 of rubber or the like.

Inasmuch as the spindle 1 requires no reduction in diameter anywhere in its entire length, said spindle in the interests of lightness and strength, can very advantageously be made hollow for almost its entire length, as shown at 23, Fig. 1. The assembly of the several parts, in the respective relations described above and shown in the drawings, involves no difficulties whatsoever,—the inner ball bearing, adjacent the head 2 being first assembled, as shown, between the spindle 1 and the cup-like member 10, after which the cross plate 12 and spacer members 14, 14 and 17 are put in place, preparatory to the mounting of the outer cross plate 13; the latter, as described above, provides the race for the outer series of balls 8, 8, and when the same have been inserted, the assembly is completed by the addition of washer 19 and dust cap 20. In the structure so assembled, the spindle 1 can turn freely within the bearings provided by the balls 7, 7, or the surrounding structure can turn freely on the bearings provided by said balls. No adjustments whatsoever are required, and therefore no binding of the parts, through improper adjustment, can ever occur.

I claim:

1. In a bicycle pedal, the combination with a spindle providing a cylindrical portion and a concave seat formed at one end having its smallest diameter substantially the same as the diameter of said cylindrical spindle portion, of two series of balls, all of the same diameter, one series contacting with the seat on said spindle at one end and the other series contacting with the cylindrical surface of said spindle at its other end, a tube encircling said spindle and annular race members located at the opposite ends of said tube for retaining said balls, said race members each providing a cylindrical surface in contact with said balls.

2. In a bicycle pedal, the combination with a spindle providing a cylindrical portion and a concave seat formed at one end having its smallest diameter substantially the same as the diameter of said cylindrical spindle portion, of two series of balls, all of the same diameter, one series contacting with the seat of said spindle at one end and the other series contacting with the cylindrical surface of said spindle at its other end, race members providing cylindrical surfaces for retaining said balls in engagement with said spindle and washers cooperating with said balls and said spindles providing annular faces at right angles to said race surfaces to prevent endwise displacement of said balls.

3. In a bicycle pedal construction, the combination with a spindle providing an enlarged head, a cylindrical portion and an annular seat having substantially the same diameter as said cylindrical portion, of a cross plate encircling said spindle head, a second cross plate encircling the opposite end of said spindle and secured to the first cross plate, and annular members associated with said cross plates for each retaining a series of balls in engagement with said spindle, one series of said balls being in engagement with said seat and the other series being in engagement with the cylindrical portion of said spindle at its opposite end.

4. In a bicycle pedal, a spindle having an enlarged head adjacent its attachment to the bicycle crank, said spindle being of uniform diameter outwardly of said head, a concave seat formed in said head of substantially the same diameter as the outer uniform-diameter portion of said spindle, two series of balls for rotatably supporting the pedal structure on said spindle, one series contacting with the concave seat of said head and the other series contacting with the cylindrical surface of said spindle at its other end, an annular outer race member for each series of balls, and a tubular member surrounding said spindle and holding said annular race members in spaced relation.

CHARLES A. PERSONS.